United States Patent
Lichtsteiner et al.

(10) Patent No.: US 7,728,269 B2
(45) Date of Patent: Jun. 1, 2010

(54) PHOTOARRAY FOR DETECTING TIME-DEPENDENT IMAGE DATA

(75) Inventors: Patrick Lichtsteiner, Lucerne (CH); Tobi Delbruck, Zürich (CH)

(73) Assignee: Universitaet Zuerich, Zuerich (CH)

( * ) Notice: Subject to any disclaimer, the term of this patent is extended or adjusted under 35 U.S.C. 154(b) by 0 days.

(21) Appl. No.: 11/949,279

(22) Filed: Dec. 3, 2007

(65) Prior Publication Data
US 2008/0135731 A1 Jun. 12, 2008

Related U.S. Application Data

(63) Continuation of application No. PCT/CH2006/000283, filed on May 29, 2006.

(30) Foreign Application Priority Data
Jun. 3, 2005 (EP) .................................. 05405367

(51) Int. Cl.
| | |
|---|---|
| H01L 27/00 | (2006.01) |
| H03F 3/08 | (2006.01) |
| H04N 3/14 | (2006.01) |
| H01L 29/94 | (2006.01) |

(52) U.S. Cl. .............. 250/208.1; 250/214 A; 348/297; 348/308; 257/312

(58) Field of Classification Search .......... 250/208.1, 250/214.1, 214 A, 214 R, 214 LA, 214 AG, 250/214 AL, 214 LS; 348/295, 297, 298, 348/300–302, 309, 308; 257/312, 314
See application file for complete search history.

(56) References Cited

U.S. PATENT DOCUMENTS

| | | | | |
|---|---|---|---|---|
| 3,626,825 | A | * 12/1971 | Years | ........................... 396/213 |
| 5,184,018 | A | * 2/1993 | Conrads et al. | ......... 250/370.09 |
| 6,253,161 | B1 | 6/2001 | Arias-Estrada | |
| 2002/0190193 | A1* | 12/2002 | Mizuno et al. | .......... 250/214 R |
| 2003/0015647 | A1 | 1/2003 | Guo et al. | |
| 2003/0057358 | A1* | 3/2003 | Yuan | ........................ 250/214.1 |

OTHER PUBLICATIONS

International Search Report, dated Sep. 5, 2006.

* cited by examiner

*Primary Examiner*—Kevin Pyo
*Assistant Examiner*—Don Williams
(74) *Attorney, Agent, or Firm*—Laurence A. Greenberg; Werner H. Stemer; Ralph E. Locher

(57) ABSTRACT

A photoarray includes a one-dimensional or two-dimensional array of cells, each having a photosensor generating a sensor signal dependent on a light intensity at the cell, a first capacitor charged by a time-derivative of a current, at least one threshold detector detecting if a voltage over the first capacitor exceeds a threshold value and generating an output signal if it does, and a discharge device for discharging the first capacitor after occurrence of the output signal. Such a cell generates an event only when the incoming light intensity changes, which reduces the amount of data to be processed from the photoarray.

14 Claims, 2 Drawing Sheets

US 7,728,269 B2

PHOTOARRAY FOR DETECTING TIME-DEPENDENT IMAGE DATA

CROSS-REFERENCE TO RELATED APPLICATION

This is a continuation, under 35 U.S.C. §120, of copending International Application No. PCT/CH2006/000283, filed May 29, 2006, which designated the United States; this application also claims the priority, under 35 U.S.C. §119, of European Patent Application EP 05 405 367, filed Jun. 3, 2005; the prior applications are herewith incorporated by reference in their entirety.

BACKGROUND OF THE INVENTION

Field of the Invention

The invention relates to a photoarray, i.e. an array of photosensitive elements, for detecting time-dependent image data, including an array of cells each having a photosensor generating a signal dependent on a light intensity at the cell.

Real time artificial vision using a photoarray, such as is disclosed in U.S. Patent Application Publication No. US 2003/0015647, is traditionally limited to a frame rate at which the array is sampled. On the other hand, such photoarrays generate a huge amount of redundant data that needs powerful and costly post processing.

BRIEF SUMMARY OF THE INVENTION

It is accordingly an object of the invention to provide a photoarray for detecting time-dependent image data, which overcomes the hereinafore-mentioned disadvantages of the heretofore-known devices of this general type and which is better suited for real time artificial vision.

With the foregoing and other objects in view there is provided, in accordance with the invention, a photoarray for detecting time-dependent image data. The photoarray comprises a topologically one-dimensional or two-dimensional array of cells, which may or may not have rectangular boundaries. Each cell has a photosensor generating a sensor signal dependent on the light intensity at the cell, a first capacitor being charged by current proportional to the time derivative of the sensor signal, at least one threshold detector detecting if the voltage over the first capacitor exceeds a threshold value and generating an output signal if it does, and a discharge device for discharging the first capacitor after occurrence of the output signal.

In other words, charging (or discharging) the first capacitor to a given charge (defined by the threshold value) generates an event in the form of the output signal. This method of digitization is especially suited for a photoarray because it allows a reduction, in a very simple manner, of the amount of data at its source, namely at the cell. Data communication out of the array only occurs when the incoming light intensity changes. Hence, the amount of data to be processed is reduced drastically and the photoarray can transfer information at a higher rate than a conventional device.

The discharge device is used to reset the capacitor after an event.

In accordance with another feature of the invention, the photoarray may further include a signal collector collecting the output signals from all of the cells.

In accordance with a further feature of the invention, upon receiving an output signal from a given cell, the signal collector controls a reset signal generator of the given cell to generate a reset signal for discharging the first capacitor. This allows the signal collector to control the firing rate of the cells.

In accordance with another feature of the invention, each cell can further include a second capacitor in series with the first capacitor. The first capacitor in disposed between an input and an output of an inverting amplifier and the second capacitor is disposed between the photosensor and the input of the amplifier. The two capacitors and the amplifier form a switched capacitor amplifier. Advantageously, the second capacitor is much larger (e.g. ten times as large) than the first capacitor, which allows a high amplifier gain to be achieved. Since the ratio between the capacities of the capacitors defines the closed-loop gain of the amplifier and since capacitors can be manufactured with high accuracy on a chip, this technique allows all of the cells of the photoarray to have a very similar response even if the properties of other elements in the cells differ due to tolerances in the manufacturing process.

In accordance with a concomitant feature of the invention, advantageously, the signal from the photosensor is proportional to the logarithm of the incoming light intensity at the given cell, which allows detection of signals over a wide dynamic range and, additionally, removes dependence on the absolute illumination.

Other features which are considered as characteristic for the invention are set forth in the appended claims. The invention will be better understood and objects other than those set forth above will become apparent when consideration is given to the dependent claims or the following detailed description thereof.

Although the invention is illustrated and described herein as embodied in a photoarray for detecting time-dependent image data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
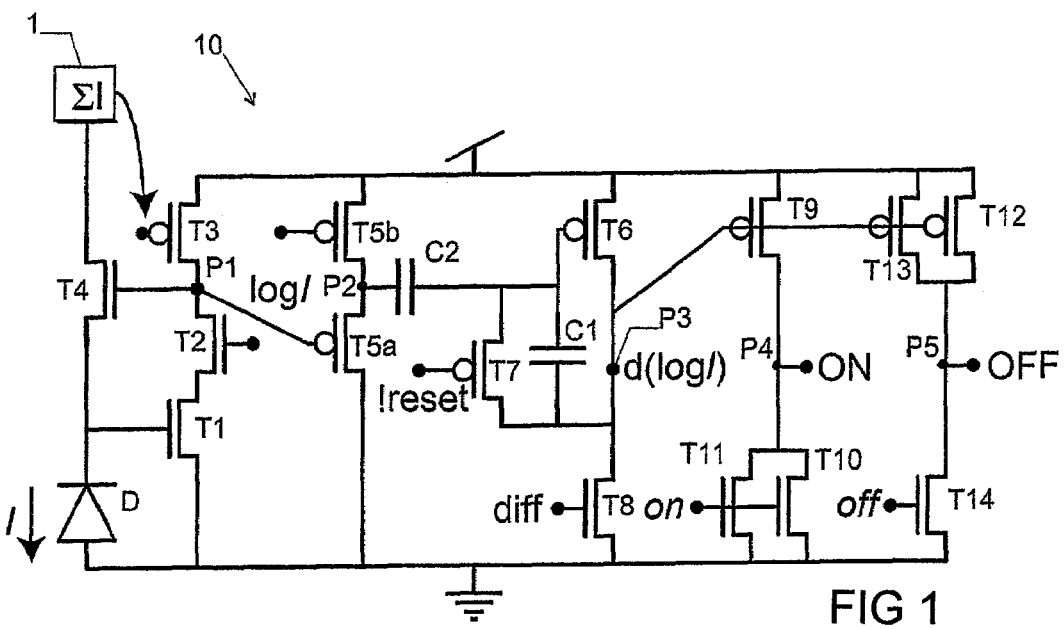
FIG. 1 is a schematic circuit diagram of a single cell of a photoarray according to the present invention.

Referring now to the figures of the drawings in detail and first, particularly, to FIG. 1 thereof, there is seen a possible embodiment of a cell 10 of a photoarray of the present invention which, as mentioned above, includes a plurality of, advantageously identical, cells, wherein each cell has a photosensor generating a sensor signal and circuitry for processing the sensor signal.

An input side of the cell 10 has a photodiode D generating a photocurrent proportional to an incoming light intensity I.

The photosensor further includes four transistors T1, T2, T3 and T4, which form an amplifier with substantially logarithmic response, generating a sensor signal having a voltage linearly related to log(I) at a point P1, i.e. a voltage V at the point P1 is V=const+k·log(I) with constant values of k and const. Similar circuitry is known from U.S. Pat. No. 5,376,813, the disclosure of which is incorporated by reference herein.

The feedback configuration has the additional advantage that it speeds up the response time of the circuit by actively clamping the photodiode voltage at a virtual ground, so that a change in photocurrent need only charge or discharge the photodiode capacitance by a small amount.

In the embodiment of FIG. 1, the currents through the photodiodes D of all of the cells are summed in a current adder 1 and a voltage proportional to the logarithm of this sum is fed to the gate of the transistor T3, which allows a reduction of the power consumption of the amplifier at low intensities. This technique is described in U.S. Patent Application Publication No. US 2204/0067876, the disclosure of which is incorporated by reference herein.

The voltage from the point P1 is fed to the gate of a transistor T5a in series with a transistor T5b of the same polarity. The gate voltage of the transistor T5b is at a fixed potential. The transistors T5a and T5b form a near-unity-gain source follower voltage buffer. The voltage at an output P2 between the transistors is again linearly related to log(I). The purpose of the voltage buffer is to isolate the two stages, thereby reducing feedback and possible instability.

The voltage from the output P2 is fed to a switched capacitor amplifier formed by two transistors T6 and T8 in series, a first capacitor C1, a second capacitor C2 and a transistor T7. The transistor T7 acts as a discharge device for discharging the first capacitor C1. The transistor T6 is an inverting amplifier with an amplifier output P3 located between the transistors T6 and T8. The first capacitor C1 is disposed between the amplifier output P3 and the input of this inverting amplifier (i.e. the gate of the transistor T6), i.e. the amplifier will strive keep the voltage at the gate of the transistor T6 constant by adjusting the voltage over the first capacitor C1. The voltage at the gate of the second transistor T8 is at a given, fixed potential "diff." The transistor T8 sinks a bias current for the amplifier input transistor T6. It also determines in part the output resistance of the amplifier. The inverting amplifier formed from the transistors T6 and T8 is constructed to have a voltage gain substantially larger than a ratio of the values of the capacitors C2/C1.

The operation of the switched capacitor amplifier is as follows: After a reset of the amplifier by discharging the capacitor C1 by shorting it to the output node P3 through the transistor switch T7, the voltage at the amplifier output P3 is equal to the voltage at the gate of the transistor T6. This voltage is determined by the bias current sunk by the transistor T8. Turning off the transistor switch T7 (opening the switch) places the switched capacitor amplifier in the active amplifying condition. If the inverting amplifier formed by the transistors T8 and T9 has an open loop gain substantially larger than the capacitor ratio C2/C1, the closed-loop gain of the switched capacitor amplifier is given by the ratio C2/C1, which is advantageously set to be fairly high, e.g. C2/C1=10, for the reasons mentioned above. Then feedback from the output P3 to the gate of the transistor T6 holds the gate of the transistor T6 closely to a constant voltage, a virtual ground. Therefore, current flowing onto the capacitor C2 must also flow out of the capacitor C1. This current is proportional to the change rate of the voltage at P2, i.e. proportional to d(log(I))/dt. The voltage appearing at the output P3 is proportional to the change at the input P2 times the closed loop gain C2/C1.

The voltage of the amplifier output P3 is fed to two threshold detectors. The first of these threshold detectors includes a first transistor assembly being formed of a transistor T9, and a second transistor assembly being formed of two transistors T10, T11 disposed in parallel. The transistor T9 of the first transistor assembly has the same polarity, geometry and size as the transistor T6. The transistors T10, T11 of the second transistor assembly have the same polarity, geometry and size as the transistor T8, and they are connected in parallel, i.e. their drains, sources and gates are tied to each other. The drain-source channel of the transistor T9 is in series with the drain-source channels of the transistors T10 and T111. The gates of the transistors T10 and T11 are connected to a fixed potential "on," which is substantially equal to the potential "diff." An output ON of the first threshold detector is formed by a point P4 between the two transistor assemblies T9 and T10, T11.

For purposes of illustration, a condition in which the potentials "diff," "on," and "off" are identical will be considered, although it will become evident that their relative values determine the actual thresholds.

The first threshold detector works as follows: After discharging the first capacitor C1, the amplifier output P3 and therefore the gate voltage of the transistor T9 is at the same potential as the gate of the transistor T6. Since the parallel transistors T10, T11 are capable of sinking twice the current of the single transistor T8, the voltage ON is near ground and the transistor T9 is saturated.

When the voltage at the point P2 rises, the capacitors C1 and C2 are charged and the voltage at the amplifier output P3 drops. Once the voltage at amplifier output P3 is below a given lower threshold voltage, the transistor T9 becomes capable of sourcing more current than the transistors T10 and T11, and the transistors T10 and T11 become saturated and the voltage at the point P4 rises to near the positive supply, i.e. the output signal ON goes to logical 1. As described below, the output signal ON is fed to a signal collector, which will eventually generate a reset signal at the gate of the transistor T7 for discharging first capacitor C1. The voltage at the amplifier output P3 goes back to its original value and the output signal ON goes back to 0. The cycle can restart again.

The second threshold detector includes two transistor assemblies, like the first threshold detector. However, in this case, the first transistor assembly is formed of two parallel transistors T12, T13, while the second transistor assembly is formed of a single transistor T14. The transistors T12, T13 are of equal polarity, size and geometry to the transistor T6, while the transistor T14 is of equal polarity, size and geometry to the transistor T8. The output OFF of the second threshold detector is formed by a point P5 between the transistor assembly T12, T13 and the transistor assembly T14.

The operation of the second threshold detector is similar to that of the first threshold detector. However, after discharging the capacitor C1, the transistor T14 will be saturated and the signal OFF will be logical 1. When the voltage at the point P2 starts to drop, the voltage at the amplifier output P3 starts to rise according to the charge accumulated on the capacitor C1, until it reaches a given upper threshold voltage, where the transistors T12 and T13 become saturated, the voltage at the point P5 starts to drop and the output signal OFF goes to logical 0. The output signal OFF is again fed to the signal collector, which will eventually generate a reset signal at the gate of the transistor T7 for discharging the first capacitor C1.

The preferred embodiment uses the transistor assemblies T10, T11 and T12, T13 being formed of two transistors connected in parallel, because the use of these "unit transistors" results in thresholds that are better controlled against process variations and allow the use of nominally-identical control signals "diff," "on" and "off." However, it should be clear that these transistor assemblies can each be replaced by single transistors as long as the signals "on" and "off" are controllable.

It becomes apparent from the above that the circuitry shown in FIG. 1 generates two output signals ON and OFF. The signal ON is issued when the voltage over the first capacitor C1 rises above a given first, positive threshold value, while the signal OFF is issued when the voltage over the first capacitor C1 falls below a given second, negative threshold value. Once an output signal ON or OFF is issued, the circuitry can be reset by feeding a reset signal to the transistor switch T7.

Figure 2:
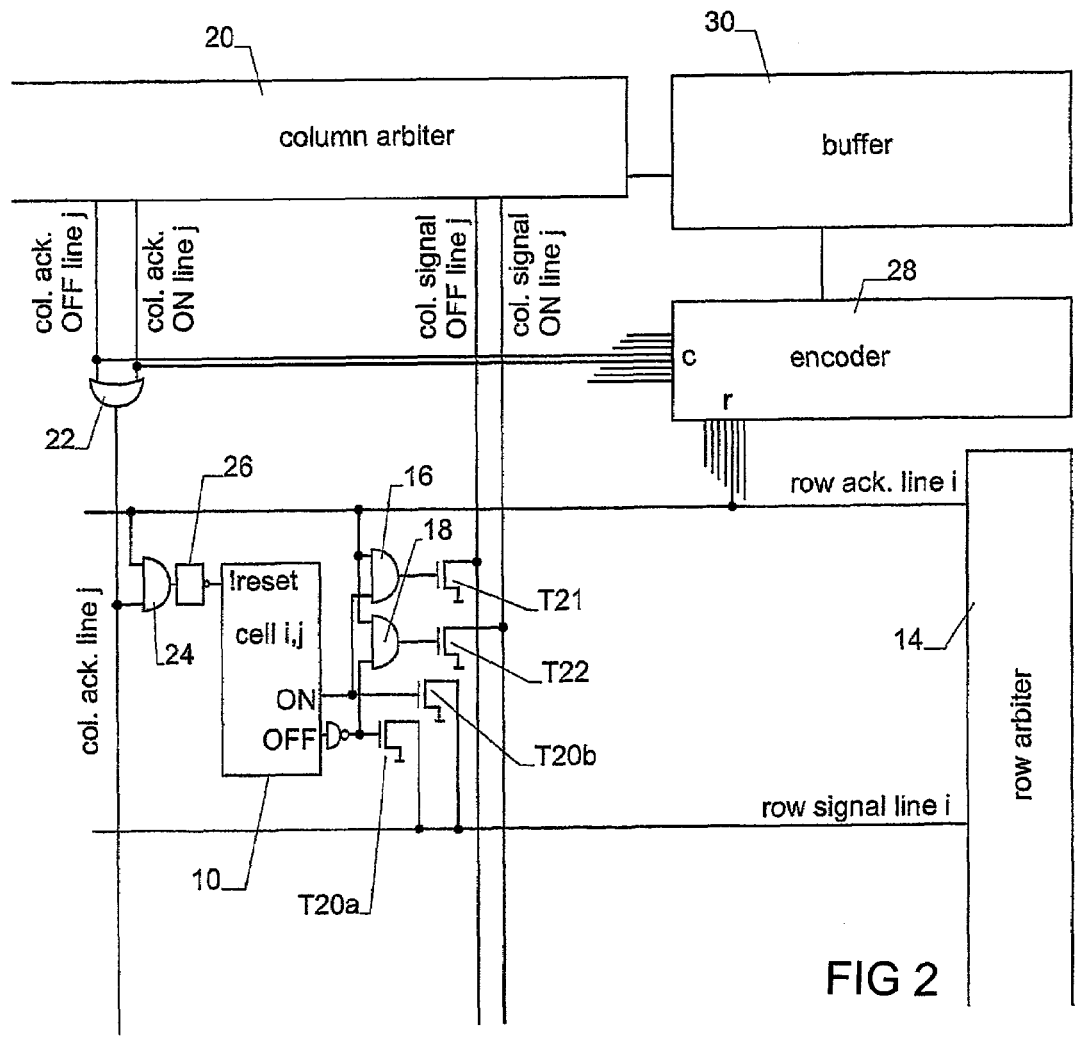
FIG. 2 is a block circuit diagram of part of the photoarray of FIG. 1.

In the following, the operation of the cell of FIG. 1 in the photoarray will be described by reference to FIG. 2.

The cells 10 can be disposed in a one-dimensional or two-dimensional array. FIG. 2 shows an embodiment with a two-dimensional array, in which the cells 10 are disposed in rows and columns. For simplicity, only one cell 10 is shown in FIG. 2. All of the other cells are disposed in the same manner, each at an intersection of a row and a column.

As can be seen, the ON and OFF output signals of the cell 10 at a row i and a column j are fed to two transistors T20a, T20b (after inversion of the OFF output signal through the use of an inverter, thereby taking into account the negative polarity of the signal generated by the second threshold detector) and they are "wire-ored" to a row signal line i. In fact, the output signals of all of the cells of a given row are "wire-ored" to the same row signal line i. A pullup device on each row pulls the row line high when no cells in the row pull it low. The signals on the row signal lines are called "row signals".

All of the row signal lines are fed to a row arbiter 14, which forms part of the signal collector of the photoarray. Once the row arbiter 14 receives a row signal on a given row signal line i and it has no other row signals pending, it issues a row acknowledge signal on a row acknowledge line i attributed to the same row i. The row acknowledge signal is only issued once the row arbiter 14 determines that the photoarray is ready to process the next event, as described below.

The row acknowledge signal is fed to two AND-gates 16, 18 attributed to each cell of the given row i. The first AND-gate 16 ANDs the row acknowledge signal and the inverted OFF output signal, and the second AND-gate 18 ANDs the row acknowledge signal and the ON output signal. Hence, the AND-gates 16, 18 generate signals only if a cell is currently issuing a row signal and receives a row acknowledge signal. The signals from the AND-gates 16, 18 are fed, through transistors T21, T22 to a column signal OFF line j and a column signal ON line j attributed to the column j, which again allows a "wire-or" of all of the column signals of a given column.

All of the column signal OFF lines and column signal ON lines input to a column arbiter 20, which forms part of the signal collector of the photoarray. Once the column arbiter 20 receives a column signal on a given column signal ON line j or column signal OFF line j, it issues a column acknowledge signal on a column acknowledge ON line j or a column acknowledge OFF line j, respectively, attributed to the same column j. The column acknowledge signal is only issued once the column arbiter 20 knows that the photoarray is ready to process the next event, as described below.

The signals from the column acknowledge OFF line and the column acknowledge ON line are fed to an OR-gate 22 to generate a column acknowledge signal on a common column acknowledge line j. At each cell the signals from the row acknowledge line and the column acknowledge line of the corresponding row and column are fed to an AND-gate 24 and from there to a pulse generator 26 to generate the reset signal to be fed to the transistor T7.

Hence, the first capacitor C1 is discharged as soon as the row and column arbiters both generate a row and column acknowledge signal on the row and column acknowledge lines of the corresponding cell. The discharging first capacitor C1 will force the output signals ON and OFF of the cell 10 to go to their inactive state.

The pulse generator 26 generates a pulse of controllable duration, called a refractory period. During the refractory period the switched capacitor amplifier is held in reset. The purpose of controllability of the refractory period is to limit the firing rate of the output signals ON and OFF of each cell, thereby preventing a single cell from overloading the signal collector, either in case of malfunction or a very rapidly changing input signal.

The signal collector of the photoarray further includes an encoder 28, which has inputs r and c connected to all of the row acknowledge lines as well as all of the column acknowledge OFF lines and column acknowledge ON lines of the photoarray. Once both the row arbiter 14 and the column arbiter 20 acknowledge an event from a given cell, the encoder 28 can determine the address of that cell from the state of the row and column acknowledge lines, because only those belonging to the given cell will be in their active state. It also can determine if the signal generating the event was an ON or an OFF signal. The corresponding address and state (ON or OFF) information is fed as an "event" to a buffer 30 to be accessed by an external receiver. After the event has been collected from the buffer 30, the buffer 30 tells the row arbiter 14 and the column arbiter 20 that it is ready to store the next event. The column arbiter 20 drops its column acknowledge signal and the row arbiter 14 is ready to acknowledge the next row signal.

Figure 3:
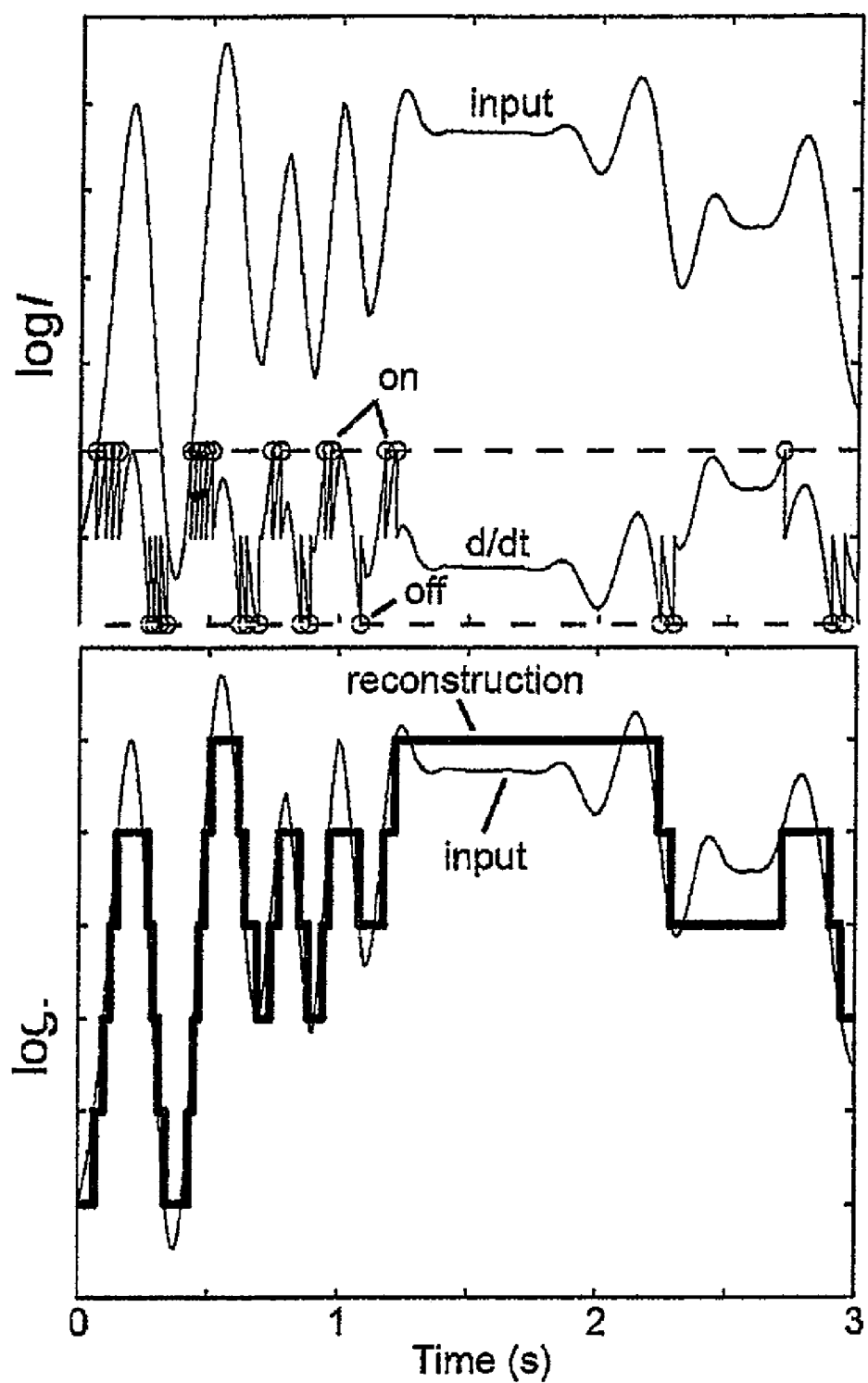
FIG. 3 is a timing diagram of some of the signals in the cell of FIG. 1.

As can be seen from the above, the photoarray can generate ON and OFF events from all of its pixels. The rate of these events depends on the rate of change of the light signal. Using the ON and OFF events for each pixel, it becomes possible to reconstruct the input signal at the given pixel. This is illustrated in FIG. 3, where the upper graph shows the input signal I, its time derivative d/dt and the voltage over the first capacitor C1, where the ON and OFF events are indicated by circles. The lower graph of FIG. 3 shows the input signal and a reconstructed input signal, the latter being calculated by adding a given intensity at each ON event and subtracting the same at each OFF event.

In the embodiment shown so far, there was one row signal line per row and two column signal lines per column. Two column signal lines were required for encoding the polarity (ON or OFF) of the signal. Alternatively, there could be two row signal lines for encoding the polarity and only one column signal line.

Similarly, if only the ON or the OFF output signals, and not both, are to be collected by the photoarray's signal collector, only one row signal line per row and only one column signal line per column would be required. In that case, however, other measures must be taken to generate a reset signal for discharging the capacitor C1 after generating a signal not forwarded to the arbiters. For example, if only the ON output signals are fed to the arbiters, the OFF output signal could be fed directly and locally back to the transistor T7 for resetting the cell.

While there are shown and described presently preferred embodiments of the invention, it is to be distinctly understood that the invention is not limited thereto but may be otherwise variously embodied and practiced within the scope of the following claims.

The invention claimed is:

1. A photoarray for detecting time-dependent image data, the photoarray comprising:
an array of cells each including:
a photosensor generating a sensor signal dependent on a light intensity at said cell;
a first capacitor being charged by a current proportional to a time-derivative of said sensor signal;
at least one threshold detector detecting if a voltage over said first capacitor exceeds a threshold value and if it does generating an output signal; and
a discharge device for discharging said first capacitor after occurrence of said output signal.

2. The photoarray according to claim 1, wherein each cell includes an inverting amplifier having an input and an output, and a second capacitor in series with said first capacitor, said first capacitor being disposed between said input and said output of said inverting amplifier, and said second capacitor being disposed between said photosensor and said input of said inverting amplifier.

3. The photoarray according to claim 2, wherein said second capacitor is much larger than said first capacitor.

4. The photoarray according to claim 2, which further comprises:
an amplifier output;
said inverting amplifier including a first transistor having a gate and a drain-source channel;
said first capacitor being disposed between said amplifier output and the gate of said first transistor; and
a second transistor having a gate applied to a defined potential, having a polarity opposite to said first transistor, and being in series with the drain-source channel of said first transistor.

5. The photoarray according to claim 4, wherein:
at least one said threshold detectors includes a first transistor assembly and a second transistor assembly interconnected in series;
at least one of said transistor assemblies includes at least one transistor and at least one of said transistor assemblies includes at least two transistors;
said transistors of said first transistor assembly have the same polarity, geometry and size as said first transistor, and said transistors of said second transistor assembly have the same polarity, geometry and size as said second transistor;
said amplifier output is connected to the gate or gates of said transistor or transistors of said first transistor assembly; and
said output signal is generated at a point between said first and said second transistor assemblies.

6. The photoarray according to claim 5, wherein the gate or gates of said transistor or transistors of said second transistor assembly are tied to substantially the same voltage as the gate of said second transistor.

7. The photoarray according to claim 1, wherein said array of cells is a two-dimensional array of cells.

8. The photoarray according to claim 1, which further comprises a signal collector collecting said output signals from all of said cells.

9. The photoarray according to claim 8, which further comprises:
discharge devices each disposed in a respective one of said cells; and
reset signal generators each triggering said discharge device of a respective one of said cells;
said signal collector, upon receiving an output signal from a given cell, controlling said reset signal generator of said given cell to trigger said discharge device of said given cell.

10. The photoarray according to claim 9, wherein:
said array of cells is a two-dimensional array of cells;
said cells are disposed in rows and columns;
one or two row signal lines are provided per row, said output signals of said cells of each of said rows are tied as row signals to said row signal line;
a row arbiter is connected to said row signal lines and detects said output signals;
one row acknowledge line is provided per row, said row arbiter generating a row acknowledge signal on said row acknowledge line upon receiving an output signal on said row signal line of said row;
one or two column signal lines are provided per column, each cell generates a column signal on its column signal line if it generates a row signal on its row signal line and obtains a row acknowledge signal on its row acknowledge line;
a column arbiter is connected to said column signal lines and detects said column signals; and
one column acknowledge line is provided per column, said column arbiter generates a column acknowledge signal upon receipt of a column signal on said column signal line of said column;
said reset signal generator of each cell is connected to said row acknowledge line and said column acknowledge line of its cell for triggering said discharge device in the presence of a row acknowledge signal and a column acknowledge signal.

11. The photoarray according to claim 10, which further comprises an encoder connected to said column acknowledge signal lines and row acknowledge signal lines for calculating an address of said cell generating an output signal.

12. The photoarray according to claim 10, wherein said row acknowledge lines and said column acknowledge lines are wired-or lines carrying signals from all of said cells in their respective row or column.

13. The photoarray according to claim 1, wherein said sensor signal is proportional to a logarithm of a light intensity at said cell.

14. The photoarray according to claim 1, wherein said at least one threshold detector of each cell includes:
a first threshold detector detecting if a voltage over said first capacitor exceeds a first, upper threshold value and generating a first output signal if it does; and
a second threshold detector detecting if a voltage over said first capacitor falls below a second, lower threshold value and generating a second output signal if it does.

* * * * *